(12) United States Patent
Diaz (10) Patent No.: US 9,159,031 B2
(45) Date of Patent: Oct. 13, 2015

(54) PREDICTING AUDIENCE RESPONSE FOR SCRIPTING

(71) Applicant: Microsoft Corporation, Redmond, WA (US)

(72) Inventor: Fernando David Diaz, Brooklyn, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 13/873,245

(22) Filed: Apr. 30, 2013

(65) Prior Publication Data

US 2014/0324758 A1 Oct. 30, 2014

(51) Int. Cl.
G06N 5/00 (2006.01)
G06N 5/04 (2006.01)

(52) U.S. Cl.
CPC .................................. G06N 5/048 (2013.01)

(58) Field of Classification Search
CPC .......................................................... G06N 5/04
See application file for complete search history.

(56) References Cited

U.S. PATENT DOCUMENTS

| | | | |
|---|---|---|---|
| 5,812,642 A * | 9/1998 | Leroy | ........................ 379/92.01 |
| 8,355,903 B1 | 1/2013 | Birnbaum et al. | |
| 2010/0211439 A1 | 8/2010 | Marci et al. | |
| 2011/0167115 A1 | 7/2011 | Gilbert et al. | |
| 2012/0215903 A1 | 8/2012 | Fleischman et al. | |
| 2012/0324324 A1 | 12/2012 | Hwang et al. | |
| 2014/0006326 A1 * | 1/2014 | Bazanov | ........................ 706/46 |
| 2014/0317030 A1 * | 10/2014 | Shen et al. | ........................ 706/12 |

OTHER PUBLICATIONS

Merriam Webster Dictionary Definition of word "Script".*
Edwards, Leigh H., "Transmedia Storytelling, Corporate Synergy, and Audience Expression", Retrieved at <<http://lass.purduecal.edu/cca/gmj/sp12/printable_pdf/sp12Article1.pdf>>, In Global Media Journal, vol. 12, Issue 20, 2012, pp. 1-12.
Garber-Barron, et al., "Towards Interest and Engagement: A Framework for Adaptive Storytelling", Retrieved at <<http://www.aaai.org/ocs/index.php/AIIDE/AIIDE12/paper/viewFile/5499/5732>>, In Eighth Artificial Intelligence and Interactive Digital Entertainment Conference, Jul. 2012, pp. 1-3.

(Continued)

Primary Examiner — Alan Chen
(74) Attorney, Agent, or Firm — Micah Goldsmith; Judy Yee; Micky Minhas (57) ABSTRACT

Various technologies described herein pertain to automatic prediction of an anticipated audience response for scripting. A sub-document unit can be received, where the sub-document unit can be part of a script. The sub-document unit, for example, can be a sentence, a paragraph, a scene, or substantially any other portion of the script. Content of the sub-document unit and a context of the sub-document unit can be analyzed to extract features of the sub-document unit. A predictive model can be employed to predict an anticipated audience response to the sub-document unit based upon the features of the sub-document unit. Moreover, the anticipated audience response to the sub-document unit predicted by the predictive model can be output.

20 Claims, 10 Drawing Sheets

(56) References Cited

OTHER PUBLICATIONS

Wand, Eku, "Interactive Storytelling: The Renaissance of Narration", Retrieved at <<http://lmc.gatech.edu/~bogost/courses/spring07/Icc3710/readings/wand_interactivestorytelling.pdf>>, New Screen Media-Cinema/Art/Narrative, British Film Institute, 2002, pp. 1-16.

Danescu-Niculescu-Mizil, et al., "You Had me at Hello: How Phrasing Affects Memorability", Retrieved at <<http://www.cs.cornell.edu/~cristian/memorability_files/memorability.pdf>>, In Proceedings of the 50th Annual Meeting of the Association for Computational Linguistics, Jul. 8, 2012, pp. 1-10.

* cited by examiner

PREDICTING AUDIENCE RESPONSE FOR SCRIPTING

BACKGROUND

Authors can write scripts for various types of works. For example, a script can be written for a speech, a screenplay, or a teleplay. A script for a speech can include lines to be spoken by a speaker. Moreover, a script for a screenplay or a teleplay can include dialog (e.g., lines to be spoken by one or more speakers) as well as other directions (e.g., stage directions). Such scripts can elicit a range of audience responses depending on factors such as word choice, narrative device, or the like.

Conventional techniques for testing drafts of an authored script commonly involve presenting the script to a test group (e.g., for panel viewing) or target audience. Accordingly, content of the script can be presented to the test group or the target audience, and a response of the test group or the target audience can be tracked. Moreover, the draft of the script can be modified by the author based on the response of the test group or the target audience. For instance, if the test group or target audience dislikes a scene of a teleplay, the author can rewrite such scene. Thus, iterations of the script can be written based on actual responses of the test group or target audience, where the script is manually edited and then presented to the test group or target audience to gauge reactions of the audience members.

SUMMARY

Described herein are various technologies that pertain to automatic prediction of an anticipated audience response for scripting. A sub-document unit can be received, where the sub-document unit can be part of a script. The sub-document unit, for example, can be a sentence, a paragraph, a scene, or substantially any other portion of the script. Content of the sub-document unit and a context of the sub-document unit can be analyzed to extract features of the sub-document unit. A predictive model can be employed to predict an anticipated audience response to the sub-document unit based upon the features of the sub-document unit. Moreover, the anticipated audience response to the sub-document unit predicted by the predictive model can be output.

According to various embodiments, the predictive model can be trained using training data that includes training scripts and sampled audience response data of audience members. The sampled audience response data can be responsive to the training scripts; accordingly, the training scripts caused the responses of the audience members included in the sampled audience response data. Moreover, the sampled audience response data can be temporally aligned with the training scripts. Examples of the sampled audience response data include social media response data of the audience members responsive to the training scripts, search query logs of the audience members responsive to the training scripts, webpage interaction logs of the audience members responsive to the training scripts, and/or sensor-collected data of the audience members responsive to the training scripts.

In accordance with various embodiments, a portion of the script can be received in a batch, where the portion of the script includes the sub-document unit. Alternatively, the sub-document unit can be received as the sub-document unit is composed (e.g., as an author is writing the sub-document unit). Whether received in the batch or online during composition, the sub-document unit can be identified and an anticipated audience response to the sub-document unit as identified can be predicted.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to predicting an anticipated audience response to a script are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, an anticipated audience response to a section of a script (e.g., a sub-document unit) can be automatically predicted. The anticipated audience response to the sub-document unit can be classified using a taxonomy of possible responses. For instance, the possible responses can be either critical or laudatory; yet, it is contemplated that other possible responses are intended to fall within the scope of the hereto appended claims. Prediction of the anticipated audience response can be effectuated using a predictive model. The predictive model, for example, can be built based on social media response data to training scripts; however, other types of audience response data can additionally or alternatively be utilized to build the predictive model.

Figure 1:
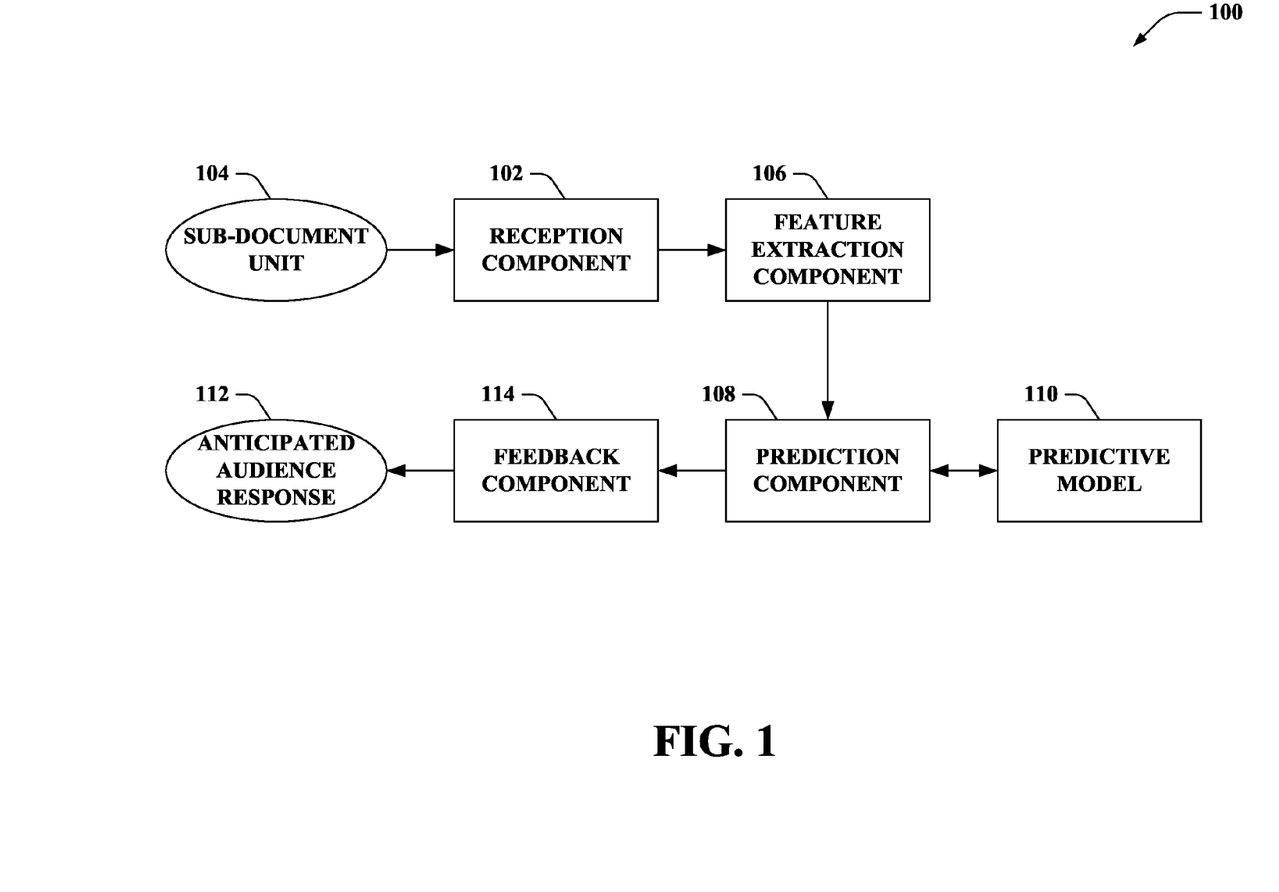
FIG. 1 illustrates a functional block diagram of an exemplary system that predicts a reaction of an audience to a script.

Referring now to the drawings, FIG. 1 illustrates a system 100 (e.g., an audience reaction prediction system) that predicts a reaction of an audience to a script. The system 100 includes a reception component 102 that receives a sub-document unit 104. The sub-document unit 104 is included in a script. Accordingly, the reception component 102 can receive at least a portion of the script that includes the sub-document unit 104. It is contemplated that substantially any sub-document unit type is intended to fall within the scope of the hereto appended claims. Examples of a sub-document unit type include a sentence, a paragraph, a scene, or the like of the script.

According to an example, the reception component 102 can receive a portion of the script in a batch, where the portion of the script includes the sub-document unit 104. Following this example, an author can compose the portion of the script (e.g., employing a word processing system (not shown)); thereafter, the composed portion of the script can be received by the reception component 102. By way of another example, the reception component 102 can receive the sub-document unit 104 as the sub-document unit 104 is composed (e.g., as an author is writing the sub-document unit 104 of the script).

The system 100 further includes a feature extraction component 106 that extracts features of the sub-document unit 104 based upon content of the sub-document unit 104 and a context of the sub-document unit 104. The content of the sub-document unit 104 can include text included in the sub-document unit 104 for delivery by least one speaker, the at least one speaker specified for the text included in the sub-document unit 104, a direction specified in the sub-document unit 104 (e.g., a stage direction, etc.), a combination thereof, and so forth. Thus, the feature extraction component 106 can extract features pertaining to words utilized in the sub-document unit 104, length of the sub-document unit 104, the speaker to deliver the sub-document unit 104 (or a portion thereof), and so forth. Moreover, the context of the sub-document unit 104 can be analyzed by the feature extraction component 106 to extract features pertaining to other lines spoken by the speaker of the sub-document unit 104, (e.g., in the script or outside of the script), lines spoken by other speakers, and the like.

The system 100 further includes a prediction component 108 that utilizes a predictive model 110 to predict an anticipated audience response 112 to the sub-document unit 104 based upon the features of the sub-document unit 104 as extracted by the feature extraction component 106. An audience for which the anticipated audience response 112 is predicted can be a historic aggregate viewing audience, a segment of the historic aggregate viewing audience, an aggregate audience for which audience response data has not been previously observed, a segment of the aggregate audience for which the audience response data has not been previously observed, a particular audience member, a combination thereof, or the like. The predictive model 110 can be utilized to predict the anticipated audience response 112 to a linguistic structure and/or narrative structure of the sub-document unit 104, for instance.

By way of example, the prediction component 108 can determine whether the anticipated audience response 112 to the sub-document unit 104 predicted by the predictive model 110 is either critical or laudatory. Following this example, the prediction component 108 can characterize the anticipated audience response 112 as being either critical or laudatory. Yet, it is also contemplated that the prediction component 108 can utilize more than two categories for classifying the anticipated audience response 112. Examples of other categories used by the prediction component 108 for classifying the anticipated audience response 112, in addition to or instead of critical and laudatory, include humor, disgust, anger, indifference, and so forth.

Moreover, the system 100 includes a feedback component 114 that outputs the anticipated audience response 112 to the sub-document unit 104 predicted by the predictive model 110. According to an example, the feedback component 114 can cause the anticipated audience response 112 to be displayed on a display screen of a computing device. According to another example, the feedback component 114 can cause the anticipated audience response 112 to be output via speakers of a device. In accordance with another example, the feedback component 114 can cause a device to provide haptic feedback corresponding to the anticipated audience response 112. By way of yet another example, it is contemplated that the feedback component 114 can cause the anticipated audience response 112 to be transmitted to a disparate computing device (e.g., via a network connection). It is also contemplated that a combination of the foregoing exemplary forms of feedback can be implemented by the feedback component 114. However, the claimed subject matter is not limited to the foregoing examples as it is to be appreciated that the feedback component 114 can cause the anticipated audience response 112 to be output via other manners.

In accordance with an illustration, the sub-document unit 104 can be a particular sentence received by the reception component 102. The feature extraction component 106 can analyze the word choices of the particular sentence, the context of the particular sentence, and a narrative structure (if applicable). The output of the analysis performed by the feature extraction component 106 can be a set of independent features that can be utilized by the prediction component 108 to predict the anticipated audience response 112 to the particular sentence. The prediction component 108 can use the predictive model 110 to generate the anticipated audience response 112, and the feedback component 114 can output the anticipated audience response 112 to the particular sentence predicted by the predictive model 110.

Figure 2:
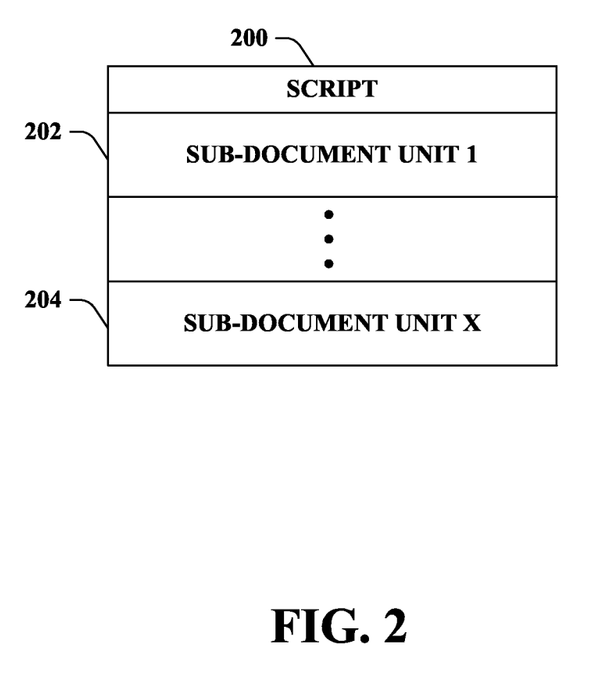
FIG. 2 illustrates an exemplary script that can be evaluated to predict anticipated audience response(s).

Turning to FIG. 2, illustrated is an exemplary script 200 that can be evaluated to predict anticipated audience response(s). The script 200 includes X sub-document units, namely, a sub-document unit 1 202, . . . , and a sub-document unit X 204, where X can be substantially any integer (collectively referred to herein as sub-document units 202-204). The sub-document units 202-204 can each be of a particular sub-document unit type, for example. Thus, by way of illustration, each of the sub-document units 202-204 can be a sentence. According to another example, two or more of the sub-document units 202-204 can have differing sub-document unit types (e.g., the sub-document unit 1 202 can be a sentence and the sub-document unit X 204 can be a scene). While depicted as being non-overlapping, it is contemplated that a portion of the text of the script 200 can be included in two or more of the sub-document units 202-204 (e.g., a sentence can be a sub-document unit as well as be included in scene where the scene is a disparate sub-document unit).

According to an example, the script 200 can be a narrative script such as a teleplay or a screenplay. By way of yet another example, the script can be a speech (e.g., a political speech, etc.). Yet, it is contemplated that other types of scripts are intended to fall within the scope of the hereto appended claims.

The script 200 can be authored utilizing a word processing system. According to an example, while the script 200 is being created (e.g., during composition of the script 200), the script 200 can be input to the system 100 of FIG. 1. Thus, predictions pertaining to anticipated audience responses to the sub-document units 202-204 can be generated (e.g., by the system 100 of FIG. 1) while the author is composing the script 200. For instance, upon completing composition of the sub-document unit 1 202, an anticipated audience response to the sub-document unit 1 202 can be predicted and output. According to another example, a portion of the script 200 can be provided in a batch to the system 100 of FIG. 1. In accordance with an illustration, the batch can include the sub-document unit 1 202; hence, upon receiving the batch, the system 100 can predict and output an anticipated audience response to the sub-document unit 1 202.

Figure 3:
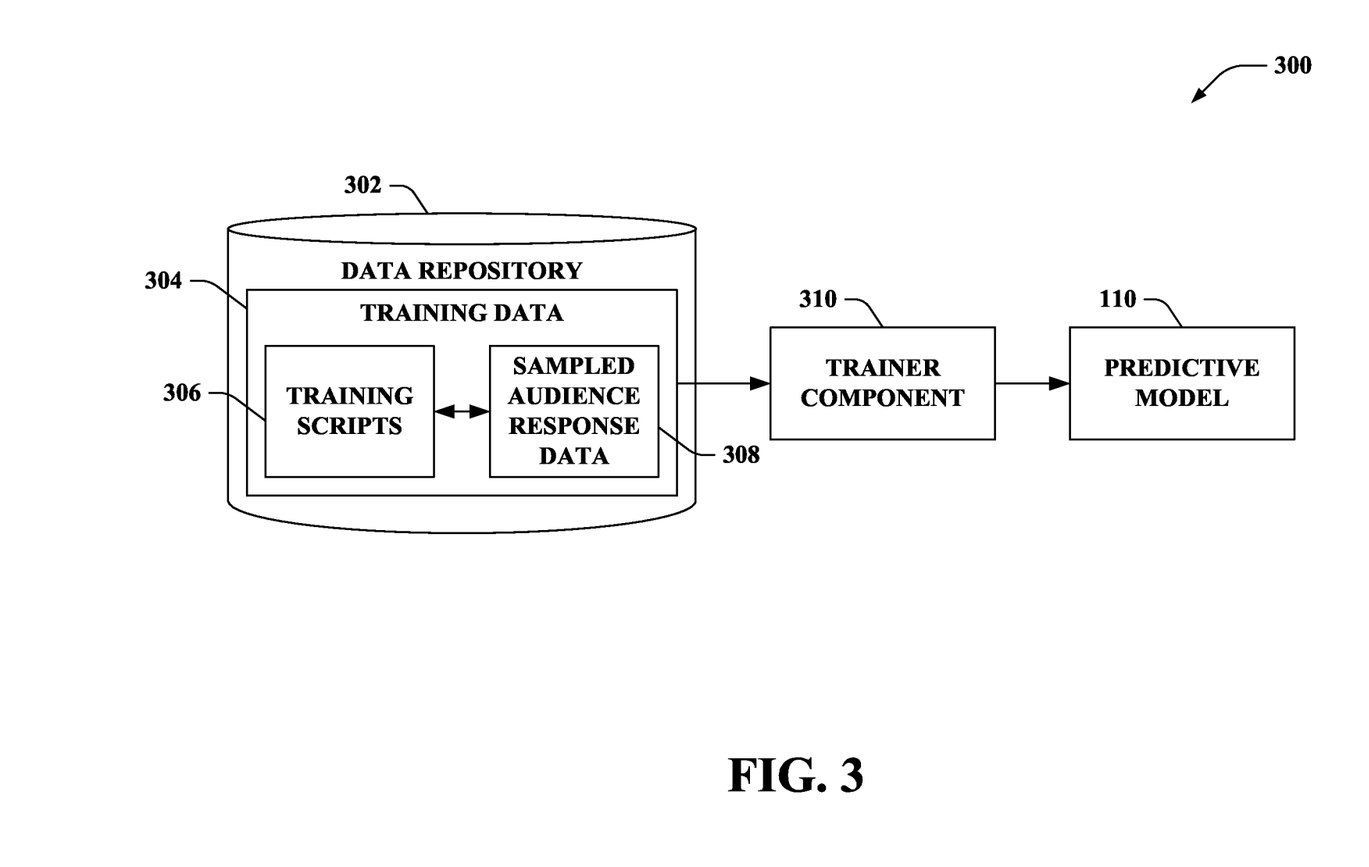
FIG. 3 illustrates a functional block diagram of an exemplary system that builds a predictive model utilized to predict anticipated audience responses to sub-document units of scripts.

Turning to FIG. 3, illustrated is a system 300 that builds the predictive model 110 utilized to predict anticipated audience responses to sub-document units of scripts. The system 300 includes a data repository 302 that retains training data 304. The training data 304 includes training scripts 306 and associated sampled audience response data 308. The sampled audience response data 308 can include data pertaining to actual responses of members of an audience that viewed or listened to the training scripts 306. The system 300 further includes a trainer component 310 that trains the predictive model 110 using the training data 304.

The training data 304 includes the training scripts 306 and the sampled audience response data 308 of audience members. The sampled audience response data 308 is responsive to the training scripts 306 (e.g., the training scripts 306 caused the responses of the audience members included in the sampled audience response data 308). Moreover, the sampled audience response data 308 is temporally aligned with the training scripts 306 for the trainer component 310. Accordingly, the trainer component 310 can use the training data 304 to train the predictive model 110, where the sampled audience response data 308 is aligned to the training scripts 306.

The predictive model 110 can be substantially any type of model that can be trained by the trainer component 310 and/or utilized to predict an anticipated audience response to a sub-document unit (e.g., using the prediction component 108 of FIG. 1). For example, the predictive model 110 can be a classification model or a sequence based model. A classification model can employ logistic regression, for instance; hence, the trainer component 310 can learn parameters for the logistic regression based upon the training data 304. Further, a sequence based model can use conditional random fields. It is to be appreciated, however, that the claimed subject matter is not so limited as it is contemplated that the predictive model 110 can implement substantially any type of machine learning algorithm.

The sampled audience response data 308 can include data collected from studio audiences, social media responses, search query logs, webpage interaction logs, and/or substantially any other audience sensor data. The trainer component 310 can learn which features or combinations of features are correlated with audience reactions to build the predictive model 110. Accordingly, the predictive model 110 can be utilized to predict an anticipated audience response given a particular sub-document unit (e.g., received by the system 100 of FIG. 1). The trainer component 310 can leverage large-scale response of social media, query logs, and other post hoc reporting to construct the predictive model 110 of audience response to scripted speech or narratives.

According to an example, the sampled audience response data 308 can include social media response data of the audience members responsive to the training scripts 306. For instance, a political speech (e.g., one of the training scripts 306) can be aligned in time with social media responses of audience members that viewed or listened to the political speech. According to another example, the sampled audience response data 308 can include search query logs of the audience members responsive to the training scripts 306. By way of yet another example, the sampled audience response data 308 can include webpage interaction logs of the audience members responsive to the training scripts 306. In accordance with yet another example, the sampled audience response data can include sensor-collected data of the audience members responsive to the training scripts 306. Following this example, substantially any type of sensor can be utilized to collect responses of audience members to the training scripts 306 (e.g., a training script can be displayed on a television to an audience member and a response of the audience member to the training script can be detected using a camera associated with the television, etc.).

Figure 4:
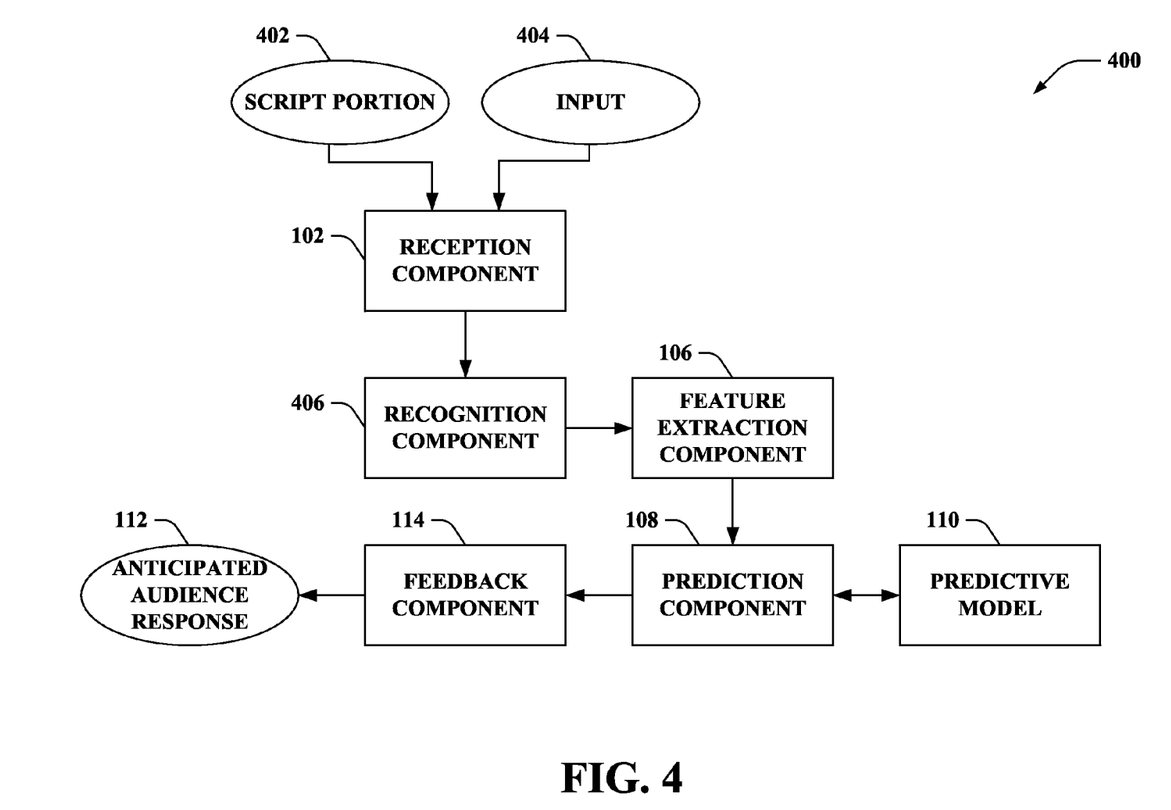
FIG. 4 illustrates a functional block diagram of an exemplary system that identifies a sub-document unit from a portion of a script and predicts an anticipated audience response to the identified sub-document unit.

Referring to FIG. 4, illustrated is a system 400 that identifies a sub-document unit from a portion of a script 402 and predicts the anticipated audience response 112 to the identified sub-document unit. The reception component 102 receives the portion of the script 402 and an input 404. Moreover, the system 400 includes a recognition component 406 that identifies the sub-document unit from the portion of the script 402 received by the reception component 102. The system 400 further includes the feature extraction component 106, the prediction component 108, the predictive model 110, and the feedback component 114 as described herein.

According to an example, the input 404 can specify a sub-document unit type. Thus, the author of the script can set the sub-document unit type; based thereupon, at least one sub-document unit having the sub-document unit type as indicated by the input 404 can be evaluated (e.g., by the feature extraction component 106, the prediction component 108, the predictive model 110, and the feedback component 114). The recognition component 406 can parse at least the portion of the script 402 to identify the sub-document unit, where the sub-document unit has the sub-document unit type as specified by the input 404. By way of illustration, the input 404 can indicate that the sub-document unit type is set to be a scene. Following this example, the recognition component 406 can identify a particular scene from the portion of the script 402. Further, the feature extraction component can extract features of the particular scene, the prediction component 108 can use the predictive model 110 to predict the anticipated audience response 112 to the particular scene based upon the features, and the feedback component 114 can output the anticipated audience response 112 to the particular scene. Moreover, a next scene can similarly be identified from the portion of the script 402 by the recognition component 406 and evaluated (e.g., by the feature extraction component 106, the prediction component 108, the predictive model 110, and the feedback component 114); yet, the claimed subject matter is not so limited.

In accordance with another example, the input 404 can specify the sub-document unit. Thus, the author of the script can select a particular sub-document unit from the script to be analyzed (e.g., by the feature extraction component 106, the prediction component 108, the predictive model 110, and the feedback component 114). Moreover, the recognition component 406 can identify the sub-document unit as specified by the input 404. Hence, the feature extraction component can extract features of the sub-document unit, the prediction component 108 can use the predictive model 110 to predict the anticipated audience response 112 to the sub-document unit based upon the features, and the feedback component 114 can output the anticipated audience response 112 to the sub-document unit. It is also contemplated that the input 404 can specify a plurality of sub-document units included in the portion of the script 402 to be evaluated (e.g., the input 404 can indicate a first sentence and a fifth sentence from the portion of the script 402 for which an author desires to receive anticipated audience response feedback, etc.).

By way of yet another example, the input 404 need not be provided to the reception component 102. Rather, the recognition component 406 can automatically detect a sub-document unit from at least the portion of the script 402. Thus, the feature extraction component can extract features of the sub-document unit that is automatically detected by the recognition component 406, the prediction component 108 can use the predictive model 110 to predict the anticipated audience response 112 to the sub-document unit based upon the features, and the feedback component 114 can output the anticipated audience response 112 to the sub-document unit.

As described herein, the portion of the script 402 can be received as the portion of the script 402 is composed or in a batch (or a plurality of batches). In accordance with an example where the portion of the script 402 is received by the reception component 102 during composition of the portion of the script 402, the recognition component 406 can identify a sub-document unit from the portion of the script 402 responsive to the sub-document unit being composed (e.g., the recognition component 406 can detect that a sentence has been composed with such sentence being identified as the sub-document unit). Responsive to the sub-document unit being composed and identified by the recognition component 406, the feature extraction component 106 can analyze the content the sub-document unit and the context of the sub-document unit to extract features of the sub-document unit. Moreover, the prediction component 108 can employ the predictive model 110 to predict the anticipated audience response 112 to the sub-document unit based upon the features of the sub-document unit. Moreover, the feedback component 114 can output the anticipated audience response 112 to the sub-document unit predicted by the predictive model 110.

According to another example, the portion of the script 402 can be received in a batch by the reception component 102. Accordingly, the recognition component 406 can identify the sub-document unit from the batch. Thereafter, the feature extraction component 106, the prediction component 108, the predictive model 110, and the feedback component 114 can be employed to output the anticipated audience response 112.

Figure 5:
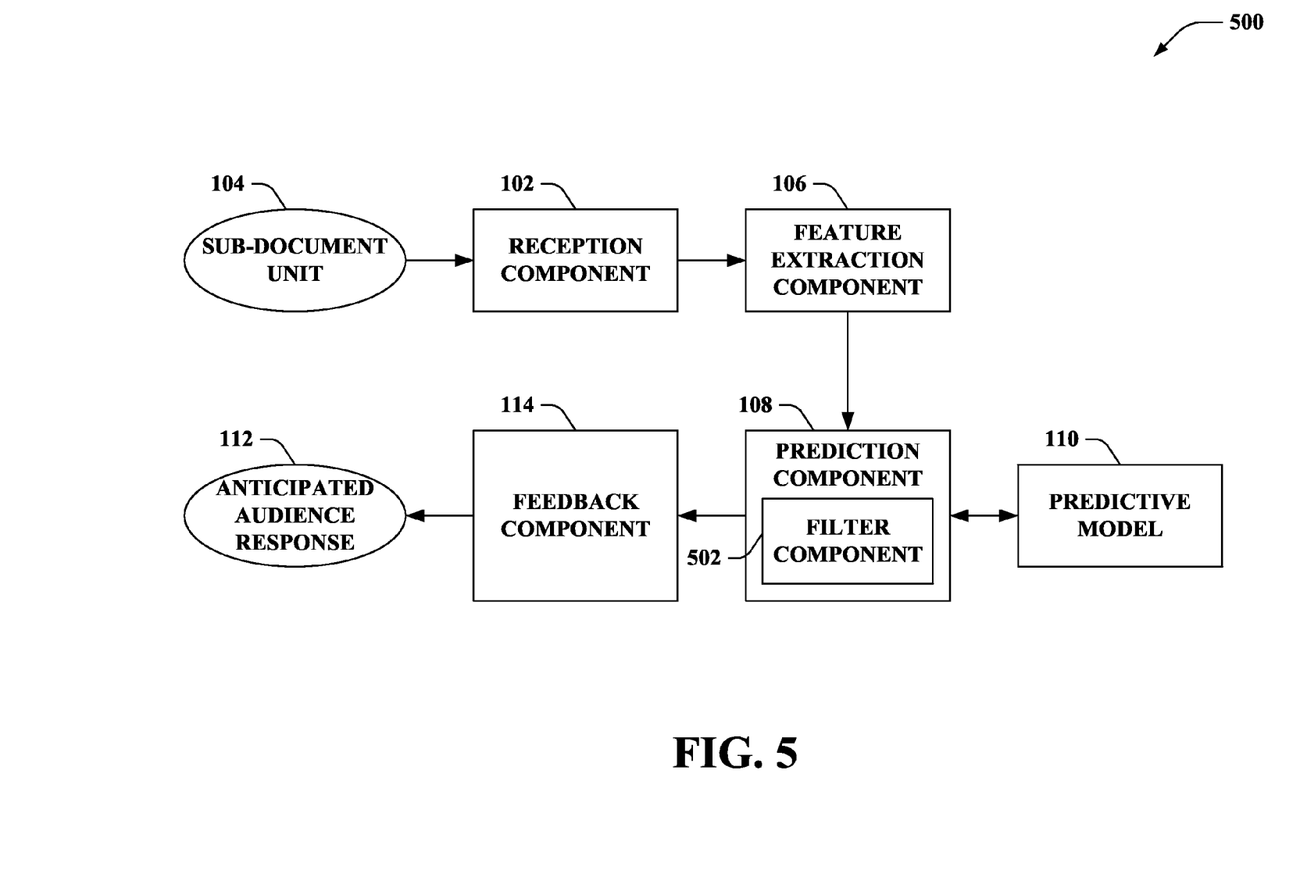
FIG. 5 illustrates a functional block diagram of an exemplary system that generates an anticipated audience response to a sub-document unit based upon an audience member characteristic.

With reference to FIG. 5, illustrated is a system 500 that generates the anticipated audience response 112 to the sub-document unit 104 based upon an audience member characteristic. The system 500 includes the reception component 102, the feature extraction component 106, the prediction component 108, the predictive model 110, and the feedback component 114. The prediction component 108 further includes a filter component 502 that conditions prediction by the predictive model 110 based upon a value of an audience member characteristic. According to an example, the audience member characteristic can be an age range of audience members. Thus, the filter component 502 can condition prediction by the predictive model 110 based upon a particular range of the audience members (e.g., 20- to 30-year-olds). Moreover, it is to be appreciated that the filter component 502 can condition the prediction by the predictive model 110 based upon more than one value of the audience member characteristic (e.g., 20- to 30-year-olds and 30- to 40-year olds). According to a further example, the filter component 502 can condition the prediction by the predictive model 110 based upon values of more than one audience member characteristic (e.g., 20- to 30-year olds and male). Thus, an audience for which the anticipated audience response 112 is predicted can be controlled by the filter component 502 to be a historic aggregate viewing audience, a segment of the historic aggregate viewing audience, an aggregate audience for which audience response data has not been previously observed, a segment of the aggregate audience for which the audience response data has not been previously observed, a particular audience member, a combination thereof, or the like.

Moreover, the filter component 502 can be employed to segment the anticipated audience response 112 to the sub-document unit 104 by an audience member characteristic. The feedback component 114 can output the anticipated audience response 112 to the sub-document unit 104 predicted by the predictive model 110 as segmented. According to an example, the anticipated audience response 112 output by the feedback component 114 can include a first response for a first segment of the audience, a second response for a second segment of the audience, and so forth.

Figure 6:
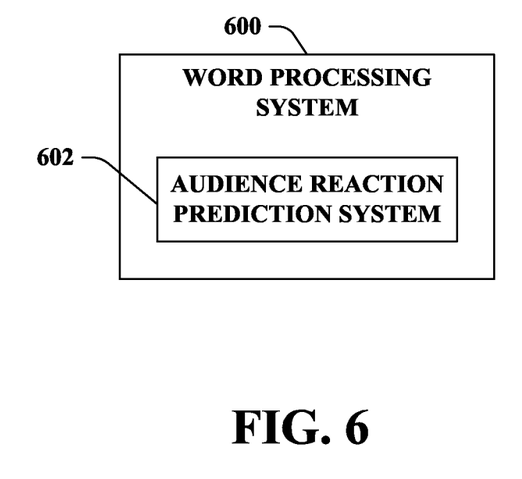
FIGS. 6-7 illustrate various exemplary implementations of an audience reaction prediction system (e.g., the system of FIG. 1, the system of FIG. 4, the system of FIG. 5, etc.).
Figure 7:
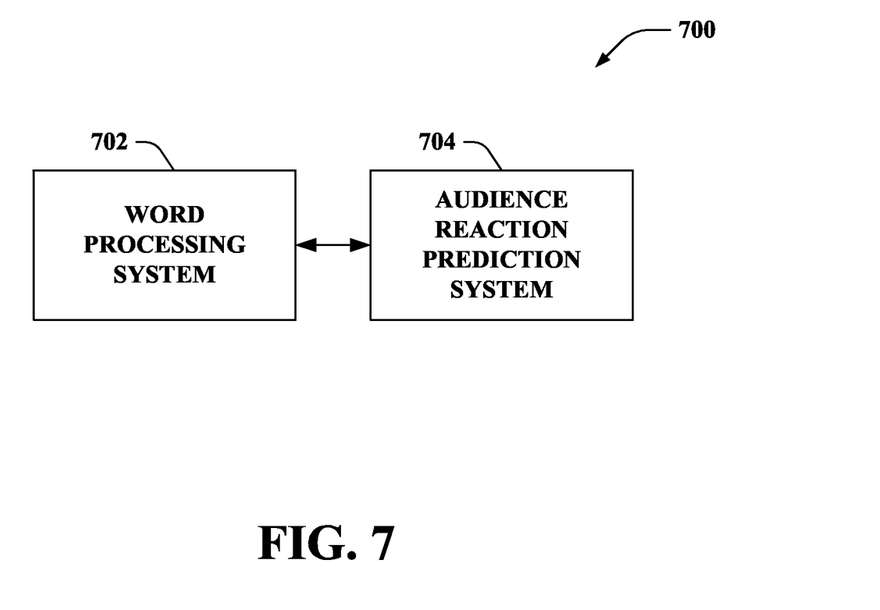

FIGS. 6-7 illustrate various exemplary implementations of an audience reaction prediction system (e.g., the system 100 of FIG. 1, the system 400 of FIG. 4, the system 500 of FIG. 5, etc.). It is to be appreciated, however, that other implementations of the audience reaction prediction system are intended to fall within the scope of the hereto appended claims. By way of illustration, a script can be created by an author using a word processing system. Following this illustration, the audience reaction prediction system can provide the author with information pertaining to an anticipated audience response to a sub-document unit included in the script.

With reference to FIG. 6, illustrated is a word processing system 600 that comprises an audience reaction prediction system 602. In the exemplary implementation depicted in FIG. 6, the audience reaction prediction system 602 is embedded in the word processing system 600 (e.g., the audience reaction prediction system 602 can be a tool included in the word processing system 600). For instance, the audience reaction prediction system 602 can be a plug-in for the word processing system 600; yet, the claimed subject matter is not so limited.

Turning to FIG. 7, illustrated is a system 700 that includes a word processing system 702 and an audience reaction prediction system 704. In contrast to the exemplary implementation of FIG. 6, the word processing system 702 and the audience reaction prediction system 704 are separate in the exemplary implementation of FIG. 7. Accordingly, the word processing system 702 can communicate with the audience reaction prediction system 704.

While FIG. 6 illustrates the audience reaction prediction system 602 being included in the word processing system 600 and FIG. 7 illustrates the word processing system 702 and the audience reaction prediction system 704 being separate systems, it is to be appreciated that a combination of such exemplary implementations can be employed.

Figure 8:
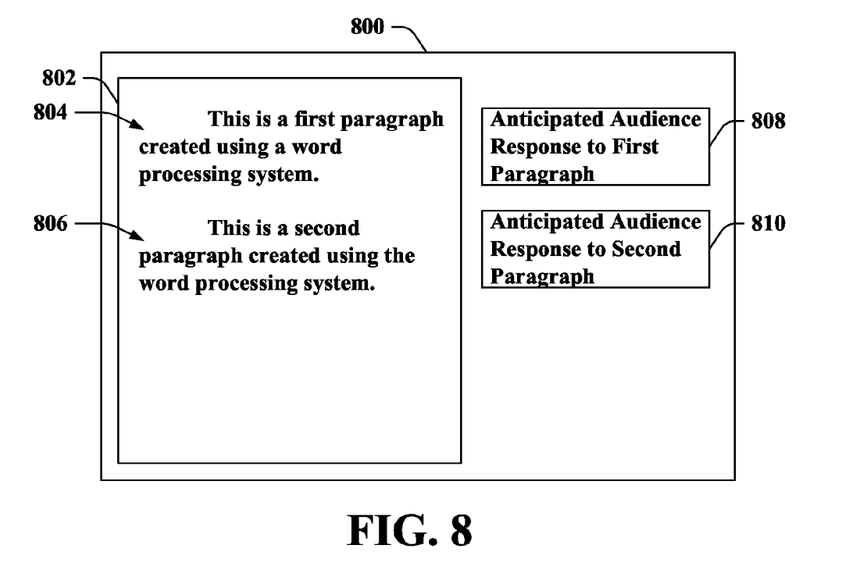
FIGS. 8-9 illustrate exemplary graphical user interfaces related to various aspects set forth herein.
Figure 9:
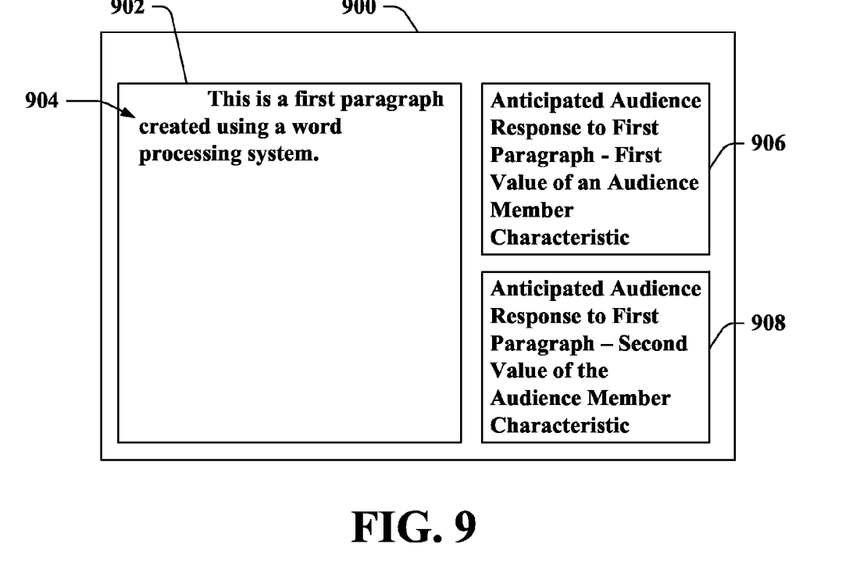

Exemplary graphical user interfaces are depicted in FIGS. 8-9. It is to be appreciated that these graphical user interfaces are presented for illustration purposes, and other graphical user interfaces are intended to fall within the scope of the hereto appended claims.

Turning to FIG. 8, illustrated is an exemplary graphical user interface 800 that includes a script generation region 802. A portion of a script is shown in the script generation region 802. As depicted, the exemplary script rendered in the script generation region 802 includes a first paragraph 804 and a second paragraph 806. According to an example, a sub-document unit type can be specified as being a paragraph of the script. As illustrated, an anticipated audience response to the first paragraph 804 can be generated and rendered in a region 808 of the graphical user interface 800. Moreover, an anticipated audience response to the second paragraph 806 can be generated and rendered in a region 810 of the graphical user interface 800.

With reference to FIG. 9, illustrated is another exemplary graphical user interface 900. Again, the graphical user interface 900 includes a script generation region 902. As shown, a script includes a first paragraph 904 rendered in the script generation region 902 of the graphical user interface 900.

In the example shown in FIG. 9, an anticipated audience response can be segmented by an audience member characteristic (e.g., demographic or other users specific data). For instance, an anticipated audience response to the first paragraph 904 for a first value of the audience member characteristic can be generated and rendered in a region 906 of the graphical user interface 900. Similarly, an anticipated audience response to the first paragraph for a second value of the audience member characteristic can be generated and rendered in a region 908 the graphical user interface 900. It is to be appreciated that substantially any other number of anticipated audience responses to the first paragraph for other values of the audience member characteristic can similarly be generated and rendered via the graphical user interface 900, although not shown.

By way of illustration, an anticipated audience response to the first paragraph 904 for male audience members can be rendered in the region 906 of the graphical user interface 900 and an anticipated audience response to the first paragraph 904 for female audience members can be rendered in the region 908 of the graphical user interface 900. Yet, the claimed subject matter is not limited to the foregoing illustration.

Figure 10:
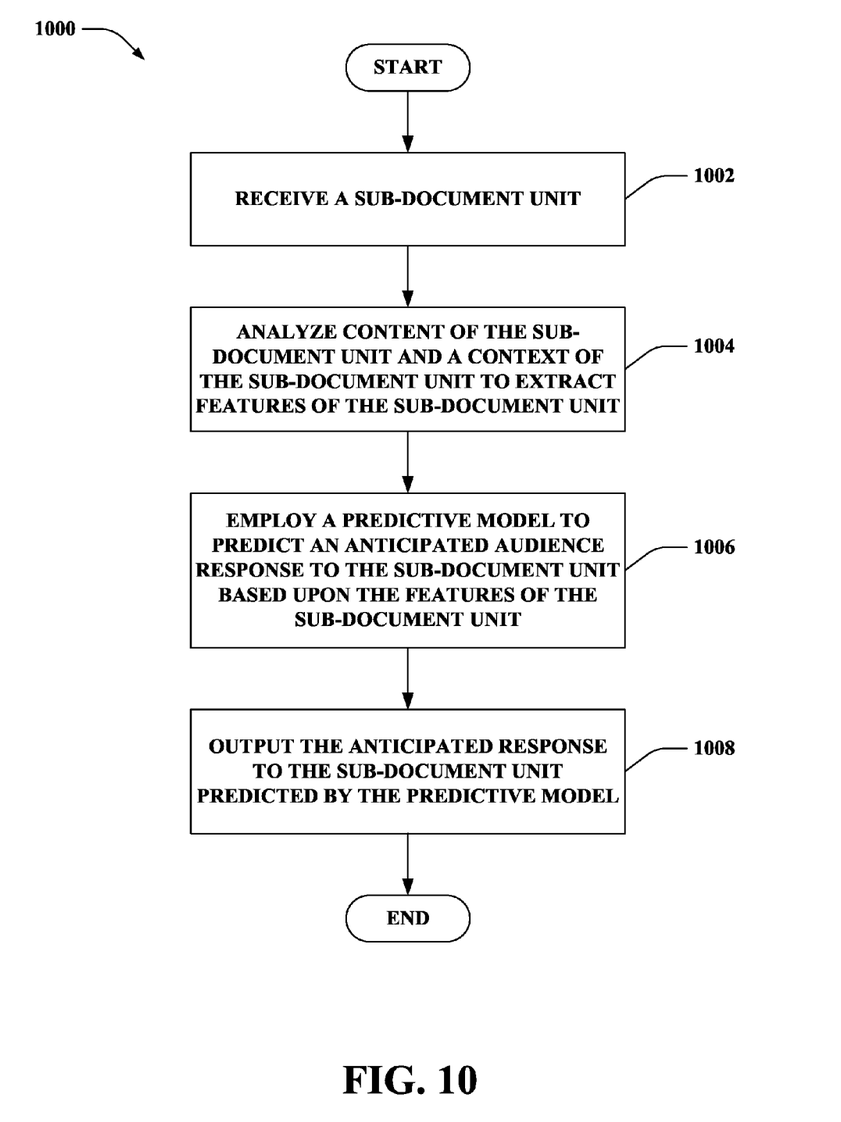
FIG. 10 is a flow diagram that illustrates an exemplary methodology for predicting a reaction of an audience to a script.
Figure 11:
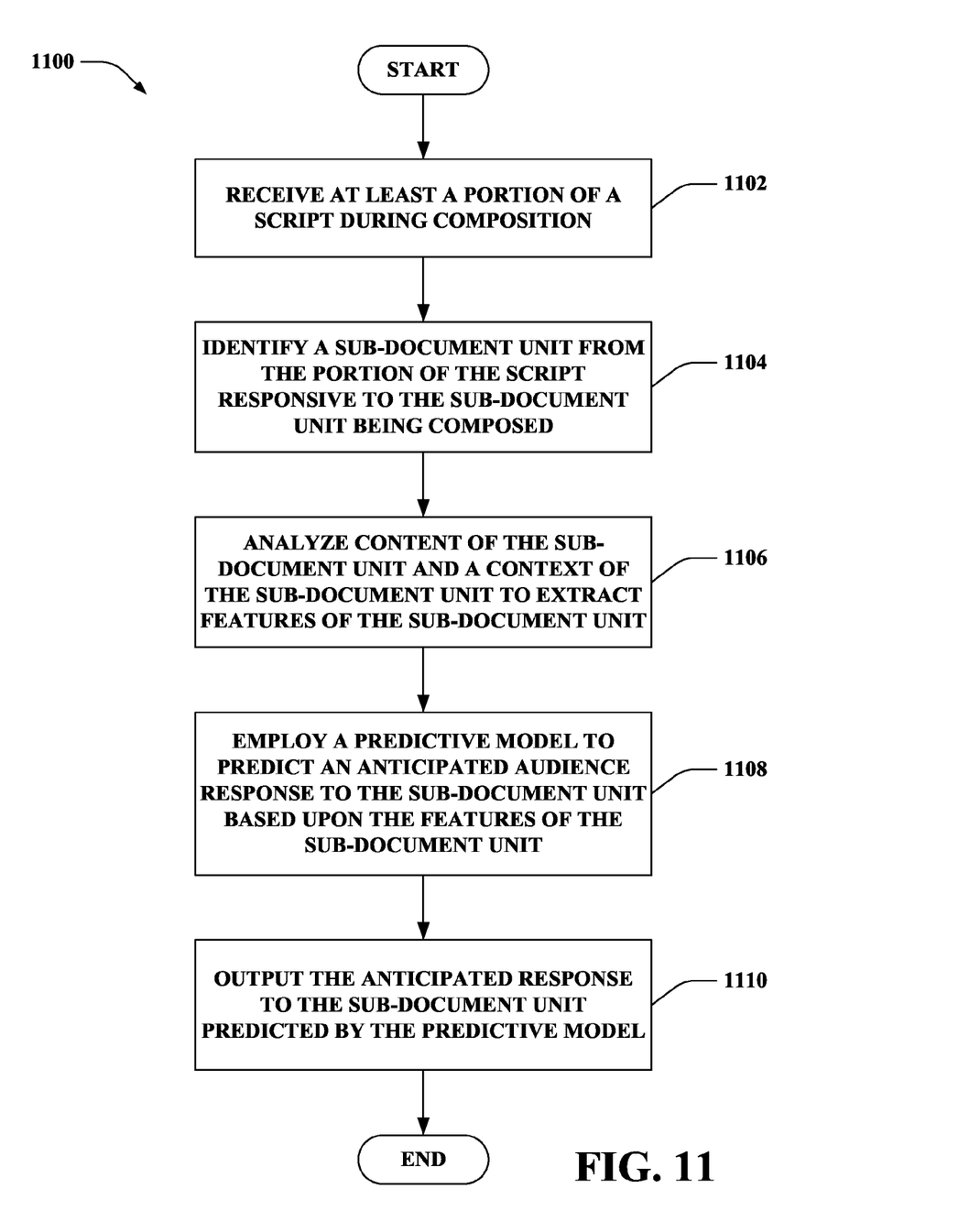
FIG. 11 is a flow diagram that illustrates an exemplary methodology for predicting a reaction of an audience to a script.

FIGS. 10-11 illustrate exemplary methodologies relating to predicting an anticipated audience response for scripting. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 10 illustrates a methodology 1000 for predicting a reaction of an audience to a script. At 1002, a sub-document unit can be received. A script can include the sub-document unit. Accordingly, at least a portion of the script that includes the sub-document unit can be received. At 1004, content of the sub-document unit and a context of the sub-document unit can be analyzed to extract features of the sub-document. At 1006, a predictive model can be employed to predict an anticipated audience response to the sub-document unit based upon features of the sub-document unit. At 1008, the anticipated response to the sub-document unit predicted by the predictive model can be output.

Turning to FIG. 11, illustrated is a methodology 1100 for predicting a reaction of an audience to a script. At 1102, at least a portion of a script can be received during composition. Accordingly, the portion of the script can be received as an author is writing. At 1104, a sub-document unit from the portion of the script can be identified responsive to the sub-document unit being composed. At 1106, content of the sub-document unit and a context of the sub-document unit can be analyzed to extract features of the sub-document unit. At 1108, a predictive model can be employed to predict an anticipated audience response to the sub-document unit based upon the features of the sub-document unit. At 1110, the anticipated response to the sub-document unit predicted by the predictive model can be output.

Figure 12:
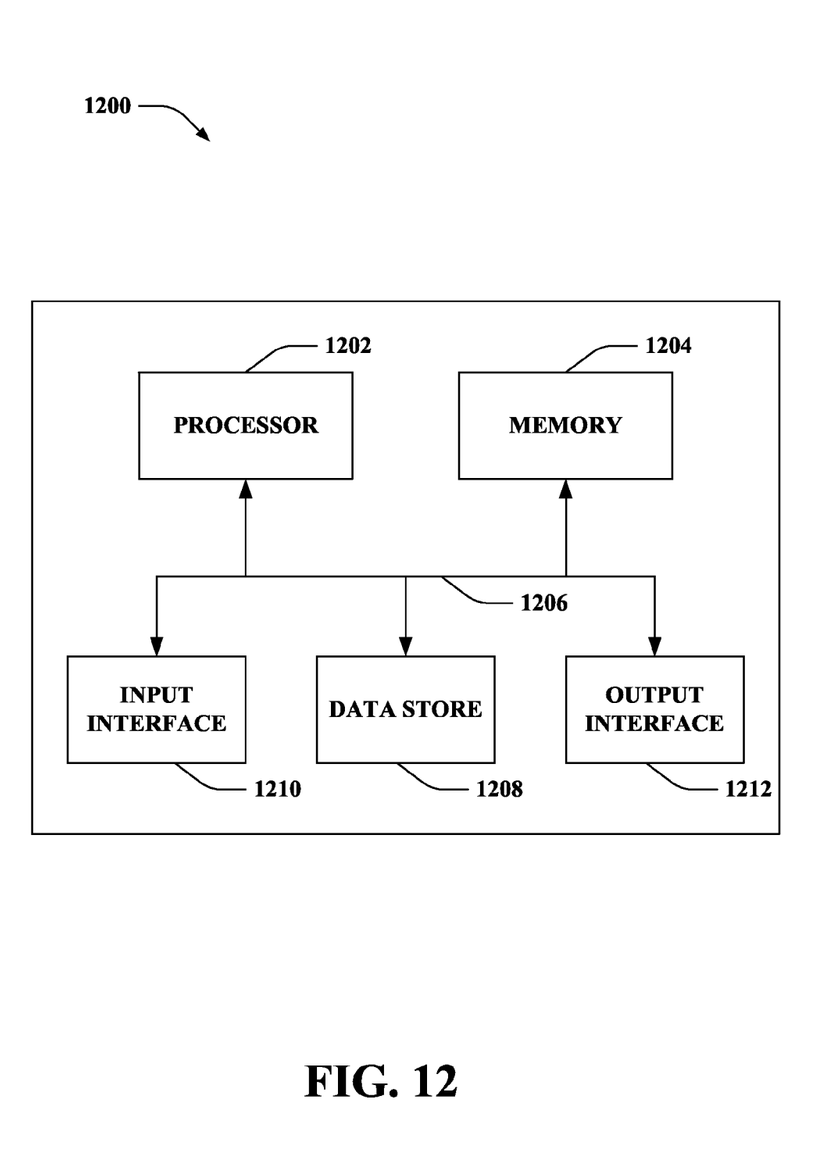
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be used in a system that predicts anticipated audience responses to sub-document units of scripts. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store a script (or a portion thereof), sub-document unit(s), features of the sub-document unit(s), training data, parameters of the predictive model 110, and so forth.

The computing device 1200 additionally includes a data store 1208 that is accessible by the processor 1202 by way of the system bus 1206. The data store 1208 may include executable instructions, a script (or a portion thereof), sub-document unit(s), features of the sub-document unit(s), training data, parameters of the predictive model 110, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method that is executed by a computer processor on a computing device, the method comprising:
   receiving a sub-document unit, wherein a script comprises the sub-document unit;
   analyzing content of the sub-document unit and a context of the sub-document unit to extract features of the sub-document unit;
   employing a predictive model to predict an anticipated audience response to the sub-document unit based upon the features of the sub-document unit, the anticipated audience response to the sub-document unit being a predicted reaction of an audience responsive to the sub-document unit; and
   causing the anticipated audience response to the sub-document unit to be at least one of displayed on a display screen or outputted via a speaker.

2. The method of claim 1, further comprising determining whether the anticipated audience response to the sub-document unit predicted by the predictive model is one of critical or laudatory.

3. The method of claim 1, wherein the predictive model is trained using training data that comprises training scripts and sampled audience response data of audience members, wherein the sampled audience response data is responsive to the training scripts, and wherein the sampled audience response data is temporally aligned with the training scripts.

4. The method of claim 3, wherein the sampled audience response data comprises social media response data of the audience members responsive to the training scripts.

5. The method of claim 3, wherein the sampled audience response data comprises at least one of search query logs or web page interaction logs of the audience members responsive to the training scripts.

6. The method of claim 3, wherein the sampled audience response data comprises sensor-collected data of the audience members responsive to the training scripts.

7. The method of claim 1, wherein the script is at least one of a narrative script or a speech.

8. The method of claim 1, further comprising receiving a portion of the script in a batch, wherein the portion of the script comprises the sub-document unit.

9. The method of claim 1, further comprising:
   receiving the sub-document unit as the sub-document unit is composed; and
   responsive to the sub-document unit being composed:
      analyzing the content of the sub-document unit and the context of the sub-document unit to extract the features of the sub-document unit;
      employing the predictive model to predict the anticipated audience response to the sub-document unit based upon the features of the sub-document unit; and causing the anticipated audience response to the sub-document unit to be at least one of displayed on the display screen or outputted via the speaker.

10. The method of claim 1, further comprising:
segmenting the anticipated audience response to the sub-document unit based on differing values of an audience member characteristic; and
causing the anticipated audience response to the sub-document unit as segmented for the differing values of the audience member characteristic to be at least one of displayed on the display screen or outputted via the speaker.

11. The method of claim 1, further comprising:
receiving input that specifies a sub-document unit type; and
parsing at least a portion of the script to identify the sub-document unit, wherein the sub-document unit has the sub-document unit type as specified.

12. The method of claim 1, further comprising receiving input that specifies the sub-document unit, wherein the anticipated audience response to the sub-document unit as specified by the input is predicted and outputted.

13. The method of claim 1, wherein the content of the sub-document unit comprises one or more of text included in the sub-document unit for delivery by at least one speaker, the at least one speaker specified for the text included in the sub-document unit, or a direction specified in the sub-document unit.

14. A system that predicts a reaction of an audience to a script, comprising:
a reception component that receives at least a portion of the script that comprises a sub-document unit, the sub-document unit being rendered as part of a graphical user interface;
a feature extraction component that extracts features of the sub-document unit based upon content of the sub-document unit and a context of the sub-document unit;
a prediction component that utilizes a predictive model to predict an anticipated audience response to the sub-document unit based upon the features of the sub-document unit, the anticipated audience response to the sub-document unit being a predicted reaction of an audience responsive to the sub-document unit; and
a feedback component that outputs the anticipated audience response to the sub-document unit predicted by the predictive model, the feedback component renders the anticipated audience response to the sub-document unit as part of the graphical user interface.

15. The system of claim 14 being embedded in a word processing system.

16. The system of claim 14, wherein the predictive model is trained using training data that comprises training scripts and sampled audience response data of audience members, wherein the sampled audience response data is responsive to the training scripts, and wherein the sampled audience response data is temporally aligned with the training scripts.

17. The system of claim 16, wherein the sampled audience response data comprises social media response data of the audience members responsive to the training scripts.

18. The system of claim 14, further comprising a recognition component that identifies the sub-document unit from the portion of the script that is received.

19. The system of claim 14, wherein the prediction component further comprises a filter component that conditions prediction by the predictive model based upon a value of an audience member characteristic.

20. A computer-readable storage medium including computer-executable instructions that, when executed by a processor, cause the processor to perform acts including:
receiving at least a portion of a script during composition;
identifying a sub-document unit from the portion of the script responsive to the sub-document unit being composed;
analyzing content of the sub-document unit and a context of the sub-document unit to extract features of the sub-document unit;
employing a predictive model to predict an anticipated audience response to the sub-document unit based upon the features of the sub-document unit, wherein the predictive model is built based upon social media response data of audience members responsive to training scripts; and
outputting the anticipated audience response to the sub-document unit predicted by the predictive model.

* * * * *